United States Patent

Nilsen

[15] 3,649,055

[45] Mar. 14, 1972

[54] CLAMP FITTING WITH SEAL FOR PLASTIC PIPE

[72] Inventor: Norman P. Nilsen, P. O. Box 33, Phelan, Calif. 92371

[22] Filed: June 29, 1970

[21] Appl. No.: 56,095

Related U.S. Application Data

[63] Continuation of Ser. No. 787,108, Dec. 26, 1968, abandoned.

[52] U.S. Cl. ..............................285/197, 138/99, 285/423, 285/DIG. 16, 285/DIG. 22
[51] Int. Cl. ..............................................F16l 5/00
[58] Field of Search...................285/21, 197, 198, 199, 260, 285/156, 192, 423, DIG. 16, DIG. 21; 137/317–325; 251/145, 196; 138/99

[56] References Cited

UNITED STATES PATENTS

| 1,883,439 | 10/1932 | Adams | 137/317 X |
|---|---|---|---|
| 1,908,821 | 5/1933 | Cornell | 285/197 |
| 2,608,989 | 9/1952 | McDonald | 137/318 |
| 2,736,335 | 2/1956 | Webber | 285/197 X |
| 2,782,806 | 2/1957 | Stambaugh et al. | 285/DIG. 16 |
| 3,159,413 | 12/1964 | Silverman | 285/423 X |

FOREIGN PATENTS OR APPLICATIONS

| 1,486,484 | 5/1967 | France | 285/197 |

*Primary Examiner*—Dave W. Arola
*Attorney*—William H. Maxwell

[57] ABSTRACT

A fitting and pipe combination, wherein fittings are applicable directly to the side walls of and over openings through pipe and especially plastic pipe and the like, either for mending the same or for establishing a lateral fluid connection. The fitting provided is a saddle-shaped element which more than half way embraces the tubular pipe body so as to pressure itself onto the pipe. And, fluid adhesive and/or fluidized fitting and pipe material is hydraulically pressured into a channel seal that encompasses the openings through the pipe and fitting, to subsequently solidify and bond the fitting to the pipe, and so as to establish a strong and durable leak-proof joinder.

10 Claims, 9 Drawing Figures

Patented March 14, 1972
3,649,055
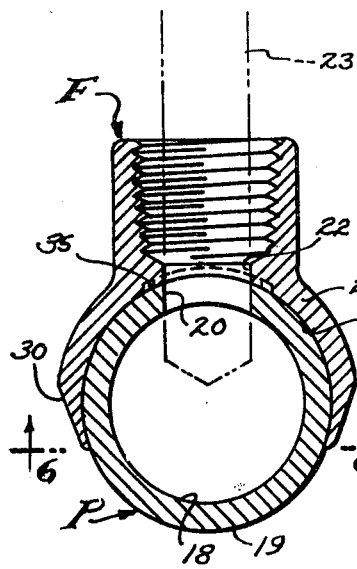
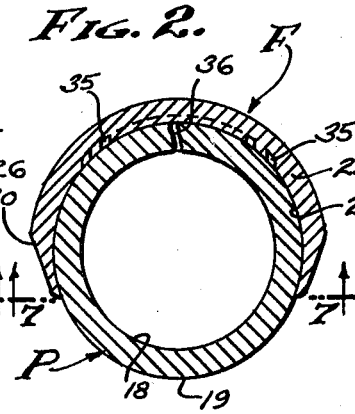
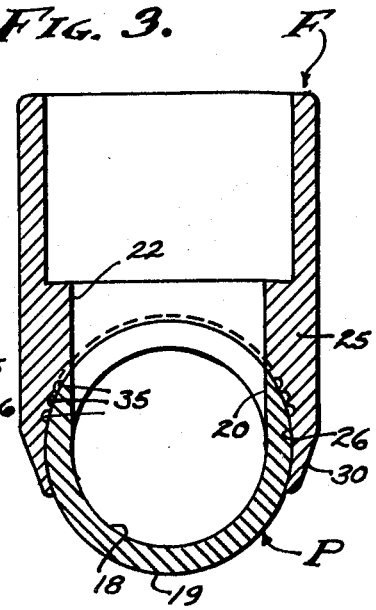
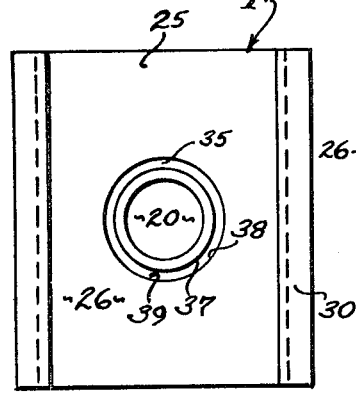
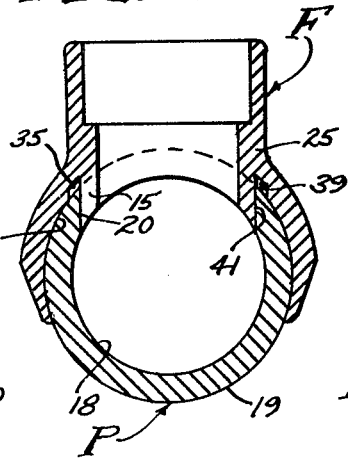
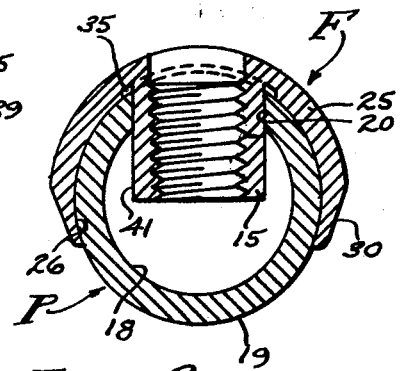
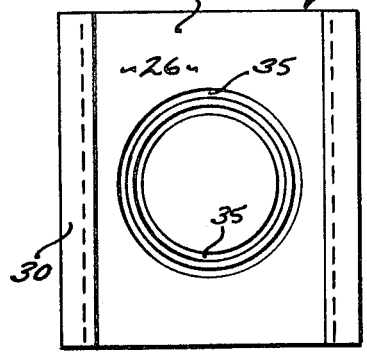
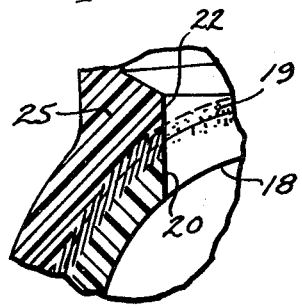
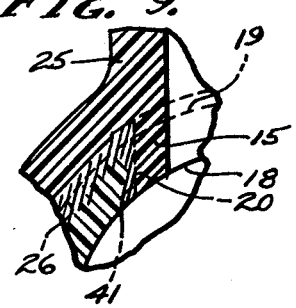
INVENTOR.
NORMAN P. NILSEN
BY
W. H. Maxwell

CLAMP FITTING WITH SEAL FOR PLASTIC PIPE

This application is a continuation of U.S. Pat. application, Ser. No. 787,100, filed Dec. 26, 1968, and now abandoned.

This invention concerns itself with the fitting of plastic piping that is fused together through the application of a solvent or the like that melts the touching materials which then solidify together as one continuous material. There are numerous so called plastic materials from which piping can be constructed out of extruded and molded parts, and at the present day a high quality pipe and its fittings are made of polyvinylchloride and known as PVC pipe and fittings. Such pipe is of durable form made as by the processes of extrusion and thereby available in long straight lengths. In order to fabricate plumbing systems, various pipe fittings of the same material are provided, for example in the form of elbows, tees, crosses etc. Additionally, some equipment into which the pipe and/or fittings open is made of plastic. Generally, the joinder of plastic pipe and its related fittings is effected by the use of male and female joints into which an adhesive or solvent is introduced and which solidifies and/or fuses the male and female parts into bonded engagement. This is the environment and generally the state of the art in which the present invention has utility.

With the development and wide use of plastic, non-metallic, piping there are certain recognized advantages and disadvantages. By using good quality piping such as PVC durability compares favorably with good quality metallic piping, however modification and/or repairs present differing problems. For instance, a fused joint of plastic cannot be unscrewed as would probably be the case with metal piping (although some metal piping is welded and would present the same problems, more or less). Also, a damaged plastic pipe cannot be welded together with the methods employed on metal pipe. Broadly, the present invention relates to the suggested foregoing problems, but is more particularly concerned with the application of lateral connections and/or fittings to plastic pipe and the like, all without disrupting continuity of pipe sections. This lateral connection concept involves the direct application of fittings to the lengths of tubular pipe bodies, either to make up additional connections as may be required and/or to make repairs, it being a general object of this invention to provide an improved fitting for adhesion and/or fusion directly onto the side wall of a tubular pipe body, to seal around an opening in the side wall of the tubular pipe body. Said last mentioned opening can be made through deliberation for open communication into a complementary passage in the fitting; or said opening can be made as by an injury or accident and which requires reclosing; and in any case there must be the establishment of a reliable seal circumscribing said opening. With the present invention means is provided to accumulate adhesives and/or fusion materials into a ring or rings thereof and which then solidifies into a seal surrounding the said opening.

Plastic piping of the type under consideration is readily worked as by cutting into bodies thereof with sharpened instruments such as saws and drills. And, being plastic in nature, these materials are not altogether conducive to the reception of continued clamped engagement. Also, there is a certain relative softness about such plastic materials, and the usually smooth and sometimes soapy surfaces thereof are easily marred, and often irrepairably damaged if jawed clamps and the like are applied. Therefore, it is an object of this invention to provide a fitting of the type under consideration that is inherently operable in itself to yieldingly urge its body into pressured engagement with the pipe body to which it is then attached. As pointed out hereinabove, an adhesive and/or solvent is employed intermediate the fitting body and pipe body, and while in the fluid state only moderate pressure is to be applied in establishing the male and female body contact with adhesive and/or solvent fluid therebetween. Therefore, with the present invention means is provided to capture the fitting body onto the pipe body with moderate force so as to establish coextensive intimate contact without distortion or disconfiguration of either body.

The establishment of suitable openings through the side walls of pipe of the type under consideration is met with problems relating to stress concentration and flow patterns. That is, a sawed-out hole is invariably rough, out of round, and for various reasons of imperfect shape. Even a drilled hole is often out of round and with rough walls. That is, pre-cut holes are most often not round and without perfect side walls. And, when such an opening is relied upon primarily, there are stress concentration points from which brakes will tend to grow, and the erosive effect of flow through the opening will not only aggravate the said stress concentrations but will permit irregular flow with damage resulting from cavitation. In one form the present invention provides a pilot opening for properly guiding a drill for the establishment of a clean opening, and in another form an embossment establishes an annulus that fills with the fluid material which subsequently solidifies homogenously with the walls of a precut opening. With the present invention means is provided for the establishment of clean perfectly aligned and correctly sized holes in the pipe walls and for the utilization of adhesive and/or solvent to eliminate stress concentration points, and to create optimum flow conditions for the elimination of irregular flow into or from the fitting.

It is also an object of this invention to provide a fitting which is adapted to be applied to the side wall of a pipe, whether it is new unused pipe or pipe that is in use and filled with fluid under pressure, and through which an aligned opening can be subsequently cut through the pipe side wall after bonding of the fitting to the pipe is assured.

The various objects and features of this invention will be fully understood from the following detailed description of the typical preferred forms and applications thereof, throughout which description reference is made to the accompanying drawings, in which:

FIGs. 1 through 5 each illustrate a form of the clamp fitting of the present invention.

FIGS. 6 and 7 are views of the clamp fittings removed from the pipes and taken as indicated by lines 6—6 and 7—7 on FIGS. 1 and 2 respectively.

FIGS. 8 and 9 are enlarged detailed fragmentary sectional views, FIG. 8 illustrating a portion of the fitting shown in FIG. 1 and FIG. 9 illustrating a portion of the fitting shown in FIG. 4.

The clamp fitting F of the present invention is shown as applied to a pipe P, or any like liquid carrying tube, and in each instance accomplishes the objectives hereinabove set forth, namely to embrace the pipe and to seal around an opening in the pipe. There are of course many variations in pipe fittings, some of which can be standardized and some of which are necessarily specialized. For instance, tapered pipe threads are commonly employed in the valves, mechanisms and equipment into which "slip-fitted" plastic pipe is connected. Therefore, the clamp fitting F can be advantageously used as a threaded adaptor or it can be used as a "slip-fit" adaptor. In any case, it is the fluid connection through the said wall of a pipe which is accomplished (preferably plastic pipe) and which is effected without disrupting continuity of said pipe.

The pipe P is a length of tubular cross sectioned plastic material or the like, preferably polyvinylchloride having an inner diameter wall 18 and an outer diameter wall 19. The wall therebetween is uniform as shown, being comprised of uniform diameters for a given size of pipe. Thus, the pipe P is essentially a continuous uniform tubular cross section, and being of plastic it can be easily cut into in order to establish lateral openings 20. And in practice, an opening 20 of round configuration and of a diameter 19 not to exceed that of the inner diameter wall 18 is cut into the pipe wall, so as to establish lateral open communication into the pipe. It is to be understood that the diameter of opening 20 can vary as circumstances require depending upon the flow requirements of the lateral connection.

In accordance with the invention the clamp fitting F is preferably of the same polyvinylchloride as the pipe P and comprises a saddle-shaped body 25 with an interior configuration to mate with the outer diameter wall 19. In this respect the body 25 is characterized by its concaved semicylindrical inner wall 26 formed on an axis concentric with the axis of wall 19 when the fitting F is in place or in working position on the pipe P. The inner wall 26 coextensively overlies the area of the pipe P in which the opening 20 is cut or formed, and in practice extends substantially beyond the opening 20 both circumferentially and axially in both directions.

The body 25 of fitting F is of substantial heft or thickness and more than half way embraces the body of pipe P. That is, the inner wall 26 of the fitting F is initially formed to touchingly engage in excess of 180° around the outer diameter wall 19, for example it extends circumferentially through an arc of approximately 220°. In practice, the opposite ends of the fitting are in planes normal to the axis thereof and the opposite margins 30 are tapered to straight edges, more or less merging tangentially with the outer diameter wall 19. Since PVC is resilient with good memory properties, the 220° (more or less) embracement of the pipe P by the fitting F provides a snap on function in making the assemblies, and followed by a clinching function which draws the fittings F onto the pipes P. As a result, the fitting F snaps into position on the pipe P and is then yieldingly urged into pressured engagement of walls 26 and 19, due to the inward resilient return of the opposite margins 30. In practice, the said margins 30 are inwardly turned to a lesser diameter than the outer diameter wall 19, and which is effected by turning the opposite margins 30 inwardly at a slightly lesser diameter than that of the outer diameter wall 19 of the pipe. It will be seen, therefore, that the cross sectional configuration of the fitting F establishes a spring that embraceably engages the pipe P to constrict thereon and thereby draw up the parts together into pressured engagement.

In accordance with the invention the fitting F and its body 25 has means formed therein to establish sealed engagement of the fitting onto the pipe P. It is the outer diameter wall 19 of the pipe adjacent to the opening 20 where an encompassing seal is provided and which involves one or more annular grooves 35 that encircle the opening 20. Broadly, in the case of mending a leak in the side wall of a pipe P and where there may not be a well defined opening, the grooves 35 are of suitable size and configuration to circumscribe the leak as shown at 36 in FIG. 2. In its fundamental and preferred form the groove 35 is a channel of uniform depth in the inner wall 26 and formed with inner and outer concentric walls 37 and 38 (see FIG. 6) joined by a bottom wall 39 (see FIG. 4). In practice, there is one or more concentric grooves 35 and each is adapted to accumulate fluid material with the aid of capillary attraction.

The invention inherently involves means to eliminate stress concentrations and to improve fluid flow characteristics through the opening 20. This means takes form in the provision of a pilot opening 22 for guiding a drill 23, or an embossment 15 that projects into the opening 20 with its outer diameter 41 in close proximity to the wall of opening 20. In practice, the outer diameter 41 of the embossment is coincidental with the inner wall 37 of the annulus channel, and as shown in FIG. 4 the end 42 of the embossment is concaved so as to be coincidental with the contour of the inner diameter wall 18 of the pipe. As shown, the orifice of fitting F as it enters into the pipe P is generously radiused affording an efficient non-turbulent entry of fluid through the fitting. In specialized installations as shown in FIG. 5, the embossment 15 can be of substantial length for the reception of threaded fittings, and in this case projects well into the pipe passage. However, the embossment 15 and its cooperative relation to the annular groove 35 remaining the same.

In the drawings I have illustrated various types of fittings and each of which incorporates the features hereinabove described. In FIG. 1 the fitting F receives a lateral pipe of about half the diameter of the main pipe P, the connection being a female pipe thread. It is to be understood that the connection is equally adapted to be a male pipe thread when so desired. In accordance with the invention, the fitting F of FIG. 1 is provided with a sealing groove 35 that surrounds the bore 22 through the fitting, the groove 35 being concentrically spaced from and surrounding the bore 22 so as to adjacently circumscribe said bore as shown. Consequently, the fitting F of FIG. 1 can be fixed to the pipe P, following which a drill is projected through the side wall of the pipe as indicated by phantom lines.

In FIG. 2 the fitting F is in the nature of a "boot" that is adapted to embrace and seal around a leak 36 (an opening). In accordance with the invention, the fitting F of FIG. 2 is provided with a plurality of sealing grooves 35, one concentrically surrounding the other and that surround the area of the leak 36. As shown, there are two grooves 35 of rather large dimension.

In FIG. 3 the fitting F receives a lateral pipe of about the same diameter of the main pipe P, the connection being a typical "slip-fit" female coupler 21 for plastic pipe and the like. In accordance with the invention, the fitting F of FIG. 3 is provided with a plurality of sealing grooves 35, concentrically surrounding each other and surrounding the bore 22 through the fitting, the innermost groove 35 adjacently circumscribing said bore as shown; grooves 35 being of rather small dimension. In this illustration the bore 22 is of the same diameter as the inner diameter 18 of pipe P, in order to show that the invention is practiced without restricting the flow passage while maintaining the seal surrounding the joinder of said flow passage. In practice therefore, it is feasible to provide a bore 22 of larger diameter than the inner diameter 18 of the pipe P, it being necessary (as in the case of the FIG. 3 fitting) to limit the depth of drilling when establishing open communication into the opening 20 through the side wall of the pipe. It is significant that the body 25 provides adequate guide means for such a drill, even when of larger diameter than the pipe P.

In FIG. 4 the fitting F is combination of the FIG. 1 and FIG. 3 fittings, with the additional feature of an embodiment 15 that projects into the opening 20 with an annulus therebetween to fill with fluid material that subsequently solidifies to establish a single homogenous connection of parts. The inner diameter end of the boss 15 is concaved to be coincidental with the inner diameter wall 18 of pipe P and consequently does not in any way obstruct the flow passage in the pipe.

In FIG. 5 the fitting F is a typical specialized fitting, similar to the fitting of FIG. 4 and with a embossment 15 that projects through the opening 20 with an annulus therebetween to fill with fluid material that subsequently solidifies to establish a single homogeneous connection of parts. The terminal end of the boss 15 enters well into the pipe passage and is threaded for the reception of special parts which circumstances may require.

With the fittings F and pipes P formed and established as above described, it is a simple matter to apply an adhesive or a solvent to the surfaces of the plastic materials to be joined. A thorough wetting of the surfaces is practiced as is commonly advisable, and which is followed by immediate application of fitting F onto the pipe P. The fitting F snaps into proper relation with the pipe P, being guided when the embossment 15 is provided to enter the opening 20, and the body 25 is pulled into pressured contact with the outer diameter wall 19 of the pipe P by virtue of the constricting margins 31 that embrace the pipe with a clinching action. It will be seen that the pressured engagement is uniform and which brings the saddle-shaped body 25 into coextensive engagement with the underlying outer diameter wall 19 of the pipe, and thereby hydraulically causing fluid material captured therebetween to flow laterally toward any interstices and/or boundaries. In practice, the pressured engagement is light and commensurate with the viscosity of the fluid adhesive, or dissolved PVC when subjected to a generous wetting or solvent, and such that capillary attraction at the perimeter of the fitting F establishes an effective boundary enhanced by exposure of the fluid (solvent) to atmosphere, and such that the groove or grooves 35 accept and accumulate fluid material. When the boss 15 is employed fluid material exudes between the embossment wall 41 and opening 20 whereupon it too is exposed to atmosphere within the pipe and establishes an effective boundary. A feature resulting from the inherent operation of the fitting is the filling of the groove 35 and any and all interstices with fluid material that subsequently solidifies and fuses the fitting and pipe into one homogenous inseparable mass. Thus, a clean and reliably strong joint is assuredly established and wherein a seal of solidified material surrounds the opening cut through the pipe.

Having described only typical preferred forms and applications of my invention, I do not wish to be limited or restricted to the specific details herein set forth, but wish to reserve to myself any modifications or variations that may appear to those skilled in the art.

Having described my invention, I claim:

1. A clamp fitting for fluid communicating attachment to and over an opening in the outer diameter wall of pipe and the like, and including, a saddle-shaped body of resilient material initially formed with a semicylindrical inner wall engageable with the outer diameter wall of the pipe throughout an arc of more than 180° and having opposite marginal portions with spaced edges closer than the diameter of the outer diameter wall of the pipe, there being an opening at and through the inner wall of the saddle-shaped body to align with and complement the first mentioned opening in the outer diameter wall of the pipe, said spaced edges being spread apart upon lateral installation of the fitting over the major diameter of the pipe and said inner wall and opposite marginal portions thereof resiliently embracing the outer diameter wall of the pipe to have clinching engagement and yieldingly draw the fitting into pressured engagement onto the pipe, there being an annular channel formed in the saddle-shaped body encircling and adjacently circumscribing the opening through the saddle-shaped body to encompass the first mentioned opening in the outer diameter wall of the pipe, and wherein a fluid adhesive is applied coextensively of the semicylindrical inner wall of the saddle-shaped body surrounding said openings and opposing the outer diameter wall of the pipe to flow under pressure therebetween and into said channel and subsequently solidify and form a seal in bonded engagement between the pipe and fitting.

2. The clamp fitting for fluid communicating attachment to pipe as set forth in claim 1, wherein the clamp fitting and pipe are made of like soluble materials, and wherein a solvent to said soluble materials is applied coextensively of and between the inner wall of the saddle-shaped body and the outer diameter wall of the pipe to dissolve and fluidize the surfaces of said materials into said adhesive.

3. A clamp fitting for fluid communicating attachment to and into an opening in the outer diameter wall of pipe and the like, and including, a saddle-shaped body of resilient material initially formed with a semicylindrical inner wall engageable with the outer diameter wall of the pipe throughout an arc of more than 180° and having opposite marginal portions with spaced edges closer than the diameter of the outer diameter wall of the pipe, there being a boss projecting from the inner wall of the saddle-shaped body to enter into the first mentioned opening and with an opening therethrough to communicate into the pipe, said spaced edges being spread apart upon the lateral installation of the fitting over the major diameter of the pipe and said inner wall and opposite marginal portions thereof resiliently embracing the outer diameter wall of the pipe to have clinching engagement and yieldingly draw the fitting into pressured engagement onto the pipe with the said boss projected through said first mentioned opening, there being an annular channel surrounding the boss projecting from the inner wall of the saddle-shaped body and formed therein to encompass the said boss, and wherein a fluid adhesive is applied coextensively of the semicylindrical inner wall of the saddle-shaped body surrounding said boss and opposing the outer diameter wall of the pipe to flow under pressure therebetween and into said channel and subsequently solidify in bonded engagement between the pipe and fitting.

4. The clamp fitting for fluid communicating attachment into pipe as set forth in claim 3, wherein the annular channel has an inner diameter wall coincidental with an outer diameter wall of the boss and formed in the inner wall of the saddle-shaped body to circumscribe the first mentioned opening in the outer diameter wall of the pipe.

5. The clamp fitting for fluid communicating attachment into pipe as set forth in claim 3, wherein the annular channel has an inner diameter wall coincidental with an outer diameter wall of the boss and formed in the inner wall of the saddle-shaped body to circumscribe the first mentioned opening in the outer diameter wall of the pipe, wherein the clamp fitting and pipe are made of like soluble materials, and wherein a solvent to said soluble materials is applied coextensively of and between the fitting and the pipe to dissolve and fluidize the surface of said materials into said adhesive.

6. The clamp fitting for fluid communicating attachment into pipe as set forth in claim 3, wherein the clamp fitting and pipe are made of like soluble materials, and wherein a solvent to said soluble materials is applied coextensively of and between the inner wall of the saddle-shaped body and the outer diameter wall of the pipe to dissolve and fluidize the surfaces of said materials into said adhesive.

7. A fitting for overlying attachment to an outer wall having an opening therein, and including, a fitting body with an inner wall engageable over said opening and with the outer wall surrounding said opening, means yieldingly drawing the fitting onto the wall, there being an annular channel formed in the inner wall of the fitting body encircling and adjacently circumscribing said opening in the outer wall, and wherein a fluid adhesive is applied coextensively of the wall surrounding said opening and opposing the inner wall of the fitting to flow under pressure therebetween and into said channel and subsequently solidify and form a seal in bonded engagement between said wall and fitting.

8. The fitting for overlying attachment to a wall with an opening therein as set forth in claim 7 wherein the wall and fitting body are made of like soluble materials, and wherein a solvent to said materials is applied coextensively of the wall surrounding said opening and opposing the inner wall of the fitting to dissolve and fluidize the surfaces of said materials into said adhesive.

9. A fitting for overlying attachment to an outer wall having an opening therein, and including, a fitting body with an inner wall engageable over said opening and with the outer wall surrounding said opening, a boss projecting from the inner wall of the fitting to enter into the first mentioned opening in the wall, means yieldingly drawing the fitting onto the wall, there being an annular channel formed in the inner wall of the fitting body to encompass said opening in the outer wall, and the said annular channel having an inner wall coincidental with the outer wall of the boss and circumscribing the first mentioned opening in the wall, and wherein a fluid adhesive is applied coextensively of the wall surrounding said opening and opposing the inner wall of the fitting to flow under pressure therebetween and into said channel and subsequently solidify in bonded engagement between said wall and fitting.

10. The fitting for overlying attachment to a wall with an opening therein as set forth in claim 9, wherein the wall and fitting body are made up of like soluble materials, and wherein the fluid adhesive is a solvent to said materials and is applied coextensively of the wall surrounding said opening and opposing the inner wall of the fitting to dissolve and fluidize the surfaces of said materials into said adhesive.

* * * * *